(12) United States Patent
Massarenti et al.

(10) Patent No.: US 7,600,223 B2
(45) Date of Patent: Oct. 6, 2009

(54) ABSTRACTED MANAGED CODE EXECUTION

(75) Inventors: Davide Massarenti, Redmond, WA (US); Donald R. Thompson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 10/972,909

(22) Filed: Oct. 25, 2004

(65) Prior Publication Data

US 2006/0101410 A1     May 11, 2006

(51) Int. Cl.
  G06F 9/45     (2006.01)
  G06F 13/00    (2006.01)
  G06F 12/00    (2006.01)
(52) U.S. Cl. .................. 717/152; 711/170; 707/206
(58) Field of Classification Search ......... 717/126–161; 707/206; 711/170
See application file for complete search history.

(56) References Cited

U.S. PATENT DOCUMENTS

| | | | |
|---|---|---|---|
| 6,237,060 B1 * | 5/2001 | Shilts et al. ................ | 711/100 |
| 6,317,872 B1 * | 11/2001 | Gee et al. .................. | 717/152 |
| 6,510,440 B1 * | 1/2003 | Alpern et al. ............... | 707/206 |
| 6,594,749 B1 * | 7/2003 | Czajkowski ................ | 711/170 |
| 6,874,074 B1 * | 3/2005 | Burton et al. ............... | 711/170 |
| 6,910,213 B1 * | 6/2005 | Hirono et al. .............. | 718/108 |
| 7,017,162 B2 * | 3/2006 | Smith et al. ................ | 719/328 |
| 7,117,246 B2 * | 10/2006 | Christenson et al. ........ | 709/206 |
| 7,149,762 B1 * | 12/2006 | Garthwaite ................ | 707/206 |
| 7,236,978 B2 * | 6/2007 | Kisliakov .................. | 707/100 |
| 7,293,051 B1 * | 11/2007 | Printezis et al. ............ | 707/206 |
| 7,395,285 B2 * | 7/2008 | Imanishi et al. ............ | 707/206 |
| 2003/0225917 A1 * | 12/2003 | Partamian et al. .......... | 709/310 |
| 2003/0231207 A1 * | 12/2003 | Huang ....................... | 345/752 |
| 2005/0204342 A1 * | 9/2005 | Broussard .................. | 717/124 |
| 2006/0101439 A1 * | 5/2006 | Massarenti et al. ......... | 717/148 |

OTHER PUBLICATIONS

Srisa-an et al., "A Performance perspective on the Active Memory System", 2002, Microprocessors and Microsystems 26, pp. 421-432.*

* cited by examiner

Primary Examiner—Wei Y Zhen
Assistant Examiner—Chih-Ching Chow

(57) ABSTRACT

In a managed code execution environment in which resources are constrained, resources may be managed in accordance with weak references for which semantics are extended.

27 Claims, 10 Drawing Sheets

ABSTRACTED MANAGED CODE EXECUTION

FIELD

The description that follows relates to abstracted managed code execution.

BACKGROUND

Computer architecture has typically defined computing platforms in terms of hardware and software. Software for computing devices came to be categorized into groups, based on function, which include: a hardware abstraction layer (hereafter "HAL"), an operating system (alternatively referred to, hereafter, as "OS"), and applications.

HAL interfaces with the computer hardware, providing services to the operating system. Thus, the operating system manages and controls functions of the computer via HAL. The operating system utilizes one or more functions known as an application program interface (also referred to as an "API") to makes computer resources available to an application programmer while, at, the same time, hiding the complexity necessary to actually control the hardware.

An application performs one or more specific tasks for a computer user, e.g., solving a mathematical equation or supporting word processing. Further an application typically executes in an isolated space with specific services in an operating system, typically referred to as a runtime execution environment.

Runtime execution environments have been developed to enhance the reliability of software execution on a growing range of processing devices including servers, desktop computers, laptop computers, and a host of mobile processing devices. In essence, runtime execution environments provide a layer of abstraction and services to an application running on a processing device, and further provide such an application with capabilities including error handling and automatic memory management.

Runtime execution environments serve as at least one of an application programming and application execution platform.

As an application programming platform, a runtime execution environment compiles targeted applications, which may be written in one of multiple computing languages, into an intermediate language (hereafter "IL"). IL is typically independent of the platform and the central processing unit (hereafter "CPU") executes IL. In fact, IL is a higher level language than many CPU machine languages.

As an application execution platform, a runtime execution environment interprets the compiled IL into native machine instructions. A runtime execution environment may utilize either an interpreter or a "just-in-time" (hereafter "JIT") compiler to execute such instructions. Regardless, the native machine instructions may then be directly executed by the CPU. As stated before, IL is CPU-independent and therefore IL can execute on any CPU platform as long as the operating system running on that CPU platform hosts an appropriate runtime execution environment. Examples of runtime environments include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine.

An application compiled into IL is referred to as "managed code." By contrast, code that does not need the runtime execution environment to execute may be referred to as native code applications.

A runtime execution environment may also include a base library that comprises a large set of class libraries and services. These class libraries and services provide access to the features of the runtime execution environment, as well as other high-level services, saving application programmers targeting a particular runtime execution environment from redundant programming efforts.

BRIEF DESCRIPTION OF THE DRAWINGS

The present invention will be described in accordance with the following figures.

DETAILED DESCRIPTION

The following description is directed to techniques for abstracting managed code execution.

The example embodiments described herein may utilize any of a variety of network protocols, including public and/or proprietary protocols. The embodiments are by way of example, and are not intended to be limiting in any manner.

Figure 1:
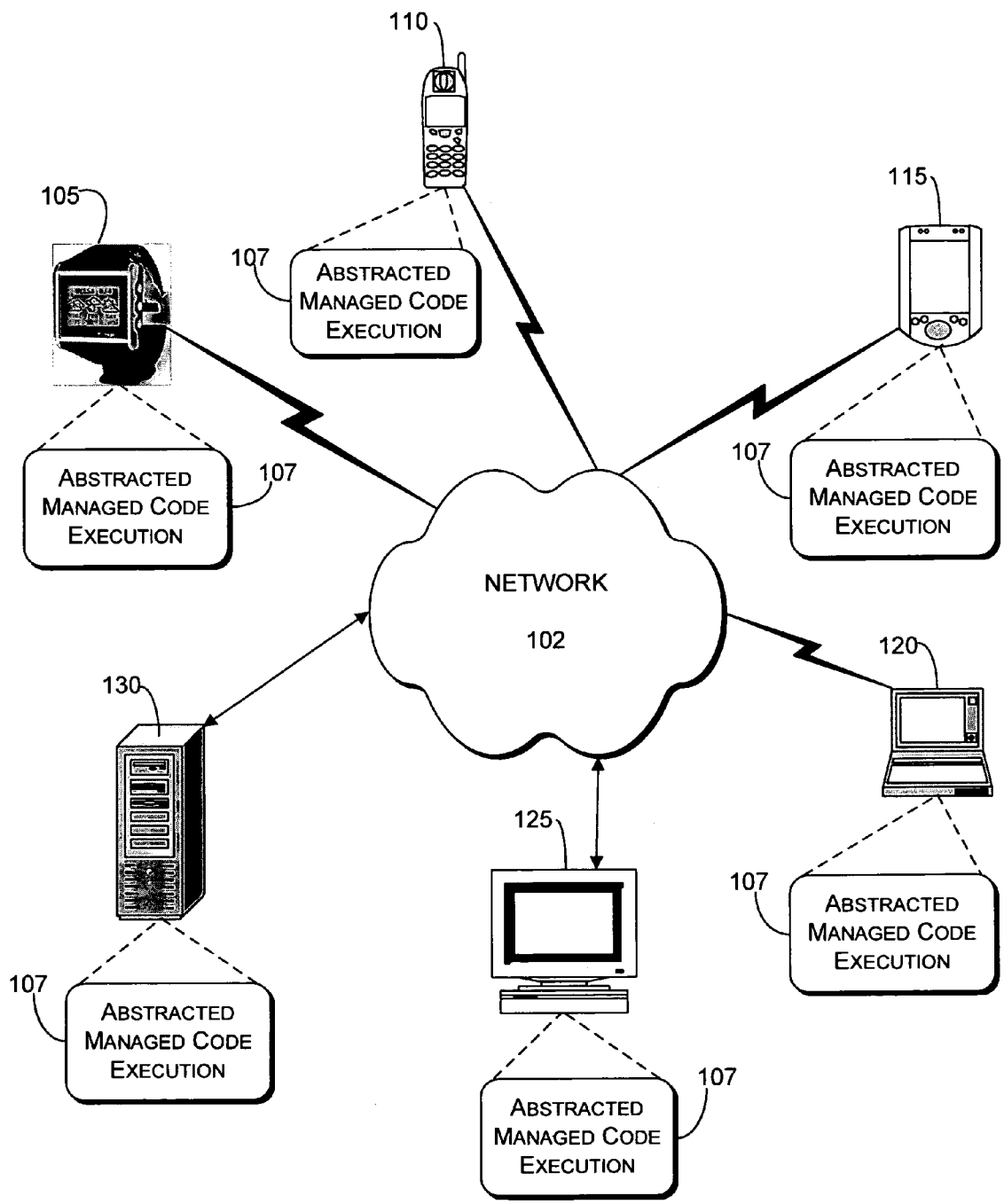
FIG. 1 shows devices communicating over a network, with the devices implementing technologies for abstracting managed code execution.

FIG. 1 shows an exemplary architecture 100 in which network 102 enables communication among client devices 105, 110, 115, 120, 125, and server device 130, all of which are capable of implementing abstracted managed code execution 107.

Network 102 is intended to represent any of a variety of conventional network topologies and types, which may include wired and/or wireless networks. Network 102 may further utilize any of a variety of conventional network protocols, including public and/or proprietary protocols. Network 102 may include, for example, the Internet as well at least portions of one or more local area networks (also referred to, individually, as a "LAN"), such as 802.11 system; a personal area network (i.e., PAN), such as Bluetooth.

Further still, examples of network 102 fully contemplate network systems for propagating carrier signals ranging from AM (amplitude modulated) and FM (frequency modulated) radio signals to first generation (1G) mobile cellular communication systems (i.e., analog systems) to second generation (2G) mobile communication systems (i.e., digital systems including e.g., GSM (global system for mobile communications), TDMA (time division multiple access), and CDMA (code division multiple access)) and to third generation (3G) multiple (i.e., high-speed multimedia data and voice). Such examples are not limiting, and examples described herein may be adapted as technologies for communication network 102 evolve.

Abstracted managed code execution 107 may include one or more example implementations of a constrained runtime execution environment. That is, implementations of abstracted managed code execution 107 may be at least one of a customizable programming and execution platform for a device in which memory resources are constrained and an operating system is likely to be absent.

Client devices 105, 110, 115, 120, and 125 may represent devices capable of, at least, abstracted managed code execution 107. Examples of such client devices, which may access network 102 in at least one of a push or pull manner by a wired and/or wireless link, are wide-ranging. Non-limiting examples of such devices for the implementations described herein include watch 105, representative of mobile devices or other personal objects; hand-held (i.e., cellular, wireless, cordless) telephone 110; personal data assistant (PDA) 115; portable computing device (e.g., laptop computer) 120, and desktop personal computer (PC) 125, which may further contemplate workstations, mainframe computers, Internet appliances, and gaming consoles. Further still, one or more of client devices 105, 110, 115, 120, and 125 may include the same types of devices either singularly or in various combinations thereof.

Server device 130, which may also be capable of implementing abstracted managed code execution 107, may provide any of a variety of data and/or functionality to computing devices 105, 110, 115, 125, and 130. The data may be publicly available or alternatively restricted, e.g., restricted to only certain users or available only if the appropriate fee is paid. Server device 130 is at least one of a network server, an application server, a web blade, or may be any combination thereof. Server device 130 may also represent any device that may serve as a source of content, and client devices 105, 110, 115, 120, and 125 may represent devices that receive such content.

Any one of client devices 105, 110, 115, 120, 125 and server device 130 may serve as a sending host or receiving host in accordance with the example embodiments described herein. For descriptive purposes, which are not intended to be limiting in any manner, server device 130 is a sending host that transmits data to a receiving host, e.g., client device 105, via network 102.

Figure 2:
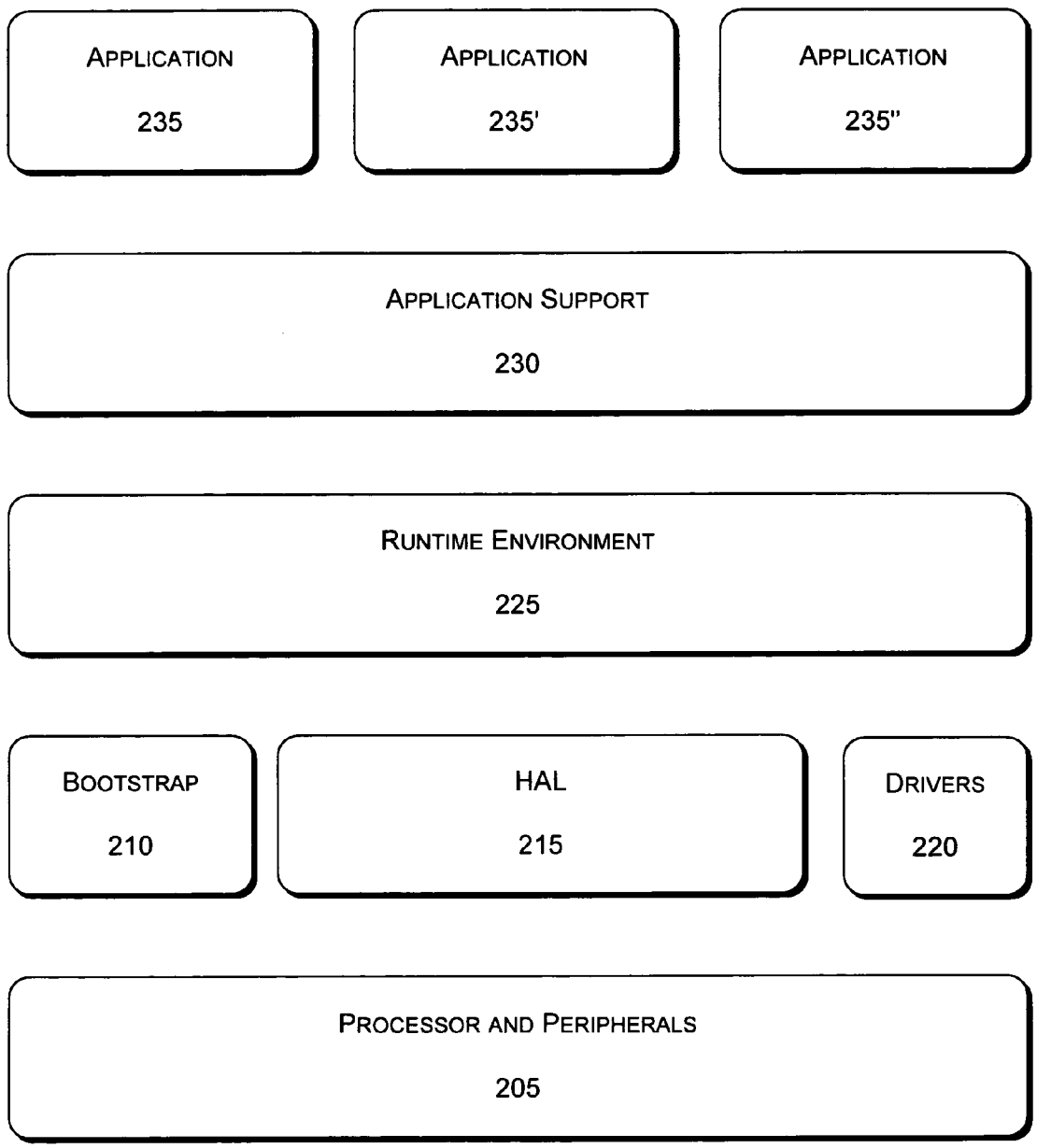
FIG. 2 shows an example of a computing device platform for implementing example technologies that abstract managed code execution.

FIG. 2, therefore, illustrates an example of a software architecture as part of a computing device platform 200 corresponding to any of client devices 105, 110, 115, 120, and 125. More particularly, computing device platform 200 may include a combination of design of hardware, software and network services that enables user interaction and connectivity over network 102.

Processor and peripherals 205 of computing device platform 200 may be varied, and are likely to be abstracted in accordance with the examples described herein. However, in accordance with a non-limiting example of a mobile client device 105, computing device platform 200 may include at least one processor, memory, and timer. Further, peripheral devices corresponding to computing device platform 200 may also be wide-ranging, including, but not limited to, a display device (with or without touch screen technology), battery, thermistor, radio, buttons, piezo buzzer, vibrator, backlight, and shock sensors.

Bootstrap 210 may be a program loaded upon startup of computing device platform 200. At least one of processor and peripherals 205 may initiate native code for bootstrap 210 from a known location for the purpose of transferring control to bootstrap 210. Bootstrap 210 may then initialize at least one of processor and peripherals 205, and set up an environment for runtime execution environment 225. According to at least one example of computing device platform 200, bootstrap 210 may derive from a form of ROM, such as Flash ROM, or in another memory storage device accessible by at least one of processor and peripherals 205.

Hardware abstraction layer (HAL) 215 may service runtime execution environment 225. HAL 215 may include a layer of assembly language that enables runtime execution environment 225 to interact with device drivers 220. HAL 215 may provide abstractions for supporting functionality of processor and peripherals 205, such as asynchronous driver execution.

Runtime execution environment 225 provides, at least, memory management, type system, locking, input/output system (hereafter referred to as "I/O"), and virtual machine capabilities, which include at least executing applications and providing simulated threading.

Application support layer 230 refers to, at least, a framework of classes, methods, and services to provide functionality for processors and peripherals 205. Examples of such include, but are in no way limited to, a shell, cryptography services, graphics libraries.

Applications 235, 235', and 235" may correspond to a layer of one or more applications that run in a memory and service environment provided by runtime execution environment 225 and application support layer 230. According to at least one example of computing device platform 200, at least one of applications 235, 235', and 235" may run on a primary thread that is linked to an activation record and assigned to a memory space, which includes process information for the particular one of applications 235, 235', and 235".

Figure 3:
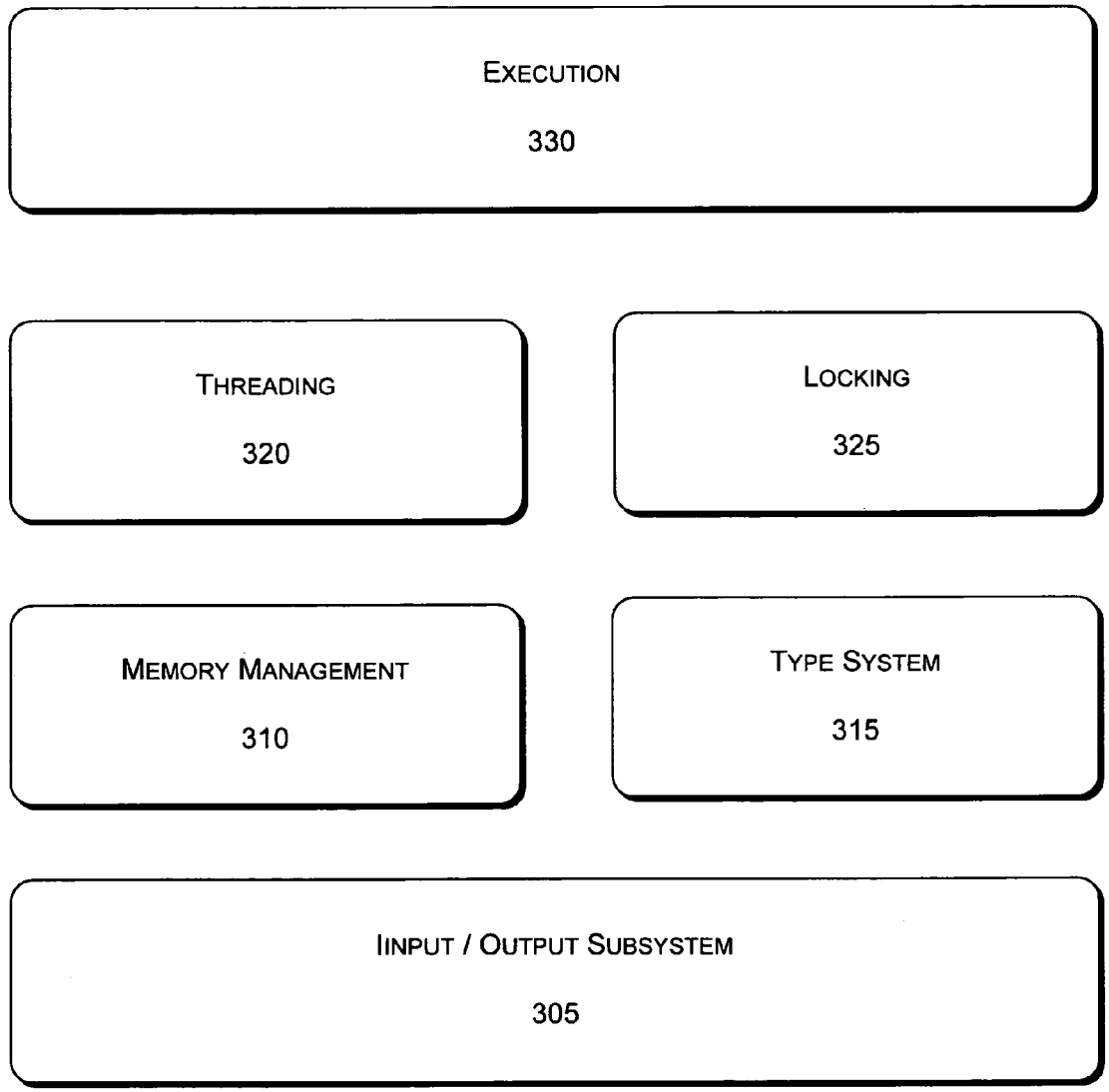
FIG. 3 shows an example of an execution environment for abstracting managed code execution.

FIG. 3 shows an example of runtime execution environment 225. More particularly, runtime execution environment 225 may be implemented by one or more of examples of computing device platform 200. Accordingly, the description of runtime execution environment 225 may refer to one or more features of FIG. 2.

According to at least one example implementation, runtime execution environment 225 may facilitate execution of managed code for computing device platform 200. Managed code may be considered to be part of a core set of application-development technologies, and may further be regarded as code that is compiled for the execution on runtime execution environment 225 to provide a corresponding service to computing device platform 200. In addition, runtime execution environment 225 may translate managed code at an interpretive level into instructions that may be proxied and then executed by a processor. A framework for runtime execution environment 225 also provides class libraries, which may be regarded as software building blocks for managed applications.

Code in runtime execution environment 225 may belong to a unit called an assembly, which holds at least two types of data including code compiled to an Intermediate Language (IL) and metadata. IL may be regarded as a form of assembly code that runtime execution environment 225 may interpret as executable code at runtime. Further, runtime execution environment 225 may translate IL into native instructions for execution by a processor. Such translation process may also be referred to as a just-in-time (JIT) compilation. The executed code may be stored in memory until the application terminates. Metadata generated by a compiler may describe individual classes for the assembly as well as the assembly unit itself. Assemblies may be generated or compiled from code on a common computing device, another computing device, or even another platform altogether.

According to a further example implementation, runtime execution environment 225 may provide at least partial functionality that may otherwise be expected from a kernel, which may be lacking from computing device platform 200 due to resource constraints. Thus, whereas a kernel may otherwise unify memory management with an OS heap, at least one example of runtime execution environment 225 may implement the following: input/output (hereafter "I/O") routine management, memory management, type system management, multi-threading management, and service routine management for asynchronous processing. Thus, runtime execution environment 225 may include I/O component 305, memory management component 310, type system component 315, threading component 320, locking component 325, and execution component 330. These components, which are to be described in further detail below, are provided as examples. The examples are not intended to be limiting to any particular implementation, and no such inference should be made. Further, the components may be implemented in examples of runtime execution environment 225 in various combinations and configurations thereof.

Further still, various operations will be described as being performed by components 305, 310, 315, 320, 325, and 330. The various operations that are described with respect to a particular one of components 305, 310, 315, 320, 325, and 330 may be carried out by the respective component or by the respective component in cooperation with a processor or computing device associated with computing device platform 200 (see FIG. 2). For example, in various implementations, the operations performed by any of components 305, 310, 315, 320, 325, and 330 may be embodied in one or more forms of computer-readable media. Alternatively, operations performed by any of components 305, 310, 315, 320, 325, and 330 may be implemented as hardware, firmware, or a combination of hardware, firmware, and software.

I/O component 305 of runtime execution environment 225 may provide asynchronous access to data sources associated with computing device platform 200, i.e., processor and peripherals 205. More particularly, I/O component 305 may provide asynchronous I/O support so that an originator of an I/O request, which may be one of applications 235, 235', or 235" or one of drivers 220, may continue execution, rather than having to wait for a corresponding I/O request to be completed. Accordingly, I/O component 305 may provide runtime execution environment 225 with robust system throughput and further streamline performance of code from which an I/O request originates.

With regard to an example of computing device platform 200 (FIG. 2), I/O component 305 may provide an I/O request to at least one of drivers 220. The receiving one of drivers 220 may perform at least a portion of the requested I/O-specific processing and then register a completion routine, which I/O component 305 may call when another of drivers 220 finishes any remaining processing corresponding to the I/O request. Respective ones of drivers 220 may provide a status via a status block, which other ones of drivers 220 may access to determine the status of an I/O request. Thus, runtime execution environment 225 may provide access to processor and peripherals 205 via I/O component 305. Such accessed peripherals may include, but are not limited to, a display device to provide visual information to a device user.

Memory management component 310 may manage a contiguous block of finite volatile RAM (i.e., memory heap) storage or a set of contiguous blocks of memory amongst the tasks running on computing device platform. Further functionalities of memory management component 310, relative to at least one of applications 235, 235', and 235" (FIG. 2), may include allocating memory to at least one of the applications, freeing at least portions of memory on request by at least one of the applications, and preventing any of the applications from intrusively accessing memory space that has been allocated to any of the other applications.

More particularly, memory management component 310 may break memory heap into small pages (e.g., 12 bytes each) that may hold one or more data types per page. According to an example in which each page holds one data type per page, each data type may be treated similarly, thus eliminating a need for a handling distinction between value and reference types. In some cases, such as arrays, the types may be grouped for efficient memory usage.

According to at least one example of runtime execution environment 225, memory management component 310 may prevent an occurrence of the aforementioned intrusive memory space access by blocking access to the address space of a cohabitating process or by prohibiting use of references by an intruding process. Such memory space hiding may be implemented by checking the security of a caller of a reference against security access privileges of the callee, and returning an exception when a violation occurs. Thus, a global event manager, which may call into applications to provide notification of asynchronous events, may push a copy of an activation record for a client into a currently running task, thus creating an impression that the execution was a call from the task itself, instead of from the event manager notification.

According to at least one example of runtime execution environment 225, memory management component 310 may provide "garbage collection" capabilities. Garbage collection may be regarded as a robust feature of managed code execution environments by which an object is automatically freed (i.e., de-allocated) if an object is no longer used by any applications, upon a sweep or scan of a memory heap. In at least one example of memory management component 310, a sweep of free memory heap may be implemented as a linear search. Such implementation may be well-suited for an example of computing device platform 200 for which memory size is constrained and for which a delay in completion of a sweep may be perceived by a user of a corresponding device.

Type system component 315 may define how types are declared, used, and managed in runtime execution environment 225. Further, type system component 315 may provide support for cross-language integration. More particularly, type system component 315 may establish a framework to enable cross-language integration, type safety, and high performance code execution, while further providing an object-oriented model to support at least partial implementation of various programming languages. For example, type system component 315 may define one or more rules that such various programming languages may be expected to follow in order to be implemented on computing device platform 200, thus enabling interaction among objects that are written in different programming languages.

Examples of recognized types include references, integers, interfaces, pointers and strings, as well as user-defined types. Typically, types derive from a common generic base type. That is, values may be considered to be binary representations of data, and types may provide a way of interpreting such data. A value type may be stored directly as a binary representation of the data corresponding to the type. The value of a reference type may be the location of the sequence of bits that represent the data corresponding to the type. A value may have an exact type that at least partially defines a representation of the value and operations that are defined on the value. Values of self-describing types may also be referred to as objects. A value of a type that implements an interface may also be regarded as a value of that interface type. Similarly, a value of a type that derives from a base type may also be regarded as a value of that base type.

Runtime execution environment 225 may use assemblies to locate and load types. An assembly may contain information that runtime execution environment 225 may utilize to resolve type references made within the scope of the assembly. According to at least one example of runtime execution environment 225, various types are treated the same way in memory.

Threading component 320, according to at least one example of runtime execution environment 225, is able to manage one or more single threads that are each shared among multiple tasks running on computing device platform 200.

A thread may be regarded as a single path of code and the state of that path that is being executed on computing device platform 200. Traditional threading models may be regarded as a single threading model and a multi-threading model. In a single threaded model, all methods of a particular component may be executed on a main thread. According to at least one example of runtime execution environment 225, a primary thread may be shared among tasks on the computing device platform 200. Thus, by such configuration, the aforementioned examples of runtime execution environment 225 execute methods individually.

Runtime execution environment 225 may further provide a cooperative threading system by which a main thread may be shared between multiple paths of code execution to simulate multiple threading (or "multi-tasking"). To keep track of each thread, an activation record may be created to represent a state of a particular thread, whereby the state may include information such as an identity of a function being called as well as an assigned priority level for the thread. Activation records may be regarded as objects held by runtime execution environment 225 to represent state associated with a given task. According to at least one example, an activation record for runtime execution environment 225 may not keep a call stack.

In a cooperative threading model, a thread that synchronously blocks during an operation may impose a loss of functionality for other threads. Thus, at least one example of runtime execution environment 225 may implement a notion of a thread (alternatively regarded as a "service routine") that is run when a system is idle. Examples of such service routines may include, but are not limited to, garbage collection and various memory management functions.

According to at least one example, runtime execution environment 225 may provide a publishing system to call into applications to notify them of events that have occurred. To implement the publishing system, an application may register a function (known as a "delegate") with an event manager. Alternative implementations of runtime execution environment 225 may utilize a global publishing system, whereby global connotes the execution environment.

Locking component 325 may utilize control structures and synchronization objects (e.g., critical sections, mutexes, and semaphores) to support interaction between simulated threads. Thus, locking component 325 may be utilized in an example of runtime execution environment 225 for which multi-threading is not implemented. As a result, locking component 325 may obviate a need for thread management code and protection against resource conflicts and deadlocking.

Execution component 330 may enable execution of managed code for computing device platform 200. Execution component 330 may be regarded as the environment in which code execution is implemented, and in which runtime services (e.g., device access and memory management) may be provided.

According to at least one example of runtime execution environment 225, before a method is run on computing device platform 200, the method may be compiled to code that is compatible with computing device platform 200. A method for which intermediate language (IL) is generated may be JIT compiled when the method is called for the first time. When the method is called for subsequent execution, existing JIT-compiled code is run. The process of JIT-compiling and then executing the code is repeated until execution is complete.

However, alternative examples of runtime execution environment 225 may not contemplate JIT-compilation, and therefore runtime execution environment 225 may interpret IL instructions individually for computing device platform 200, and repeat such actions until code execution is complete. During execution, managed code may receive services such as memory management, garbage collection, security, interoperability with any unmanaged code, debugging support, and enhanced deployment and versioning support. As managed applications are executed, references to other managed assemblies may be used. In this case, an assembly manager (i.e., loader) may be invoked to locate and read assemblies as needed. The loader may also serve to ensure validity of managed code, and set up the entry point to the assembly.

Figure 4:
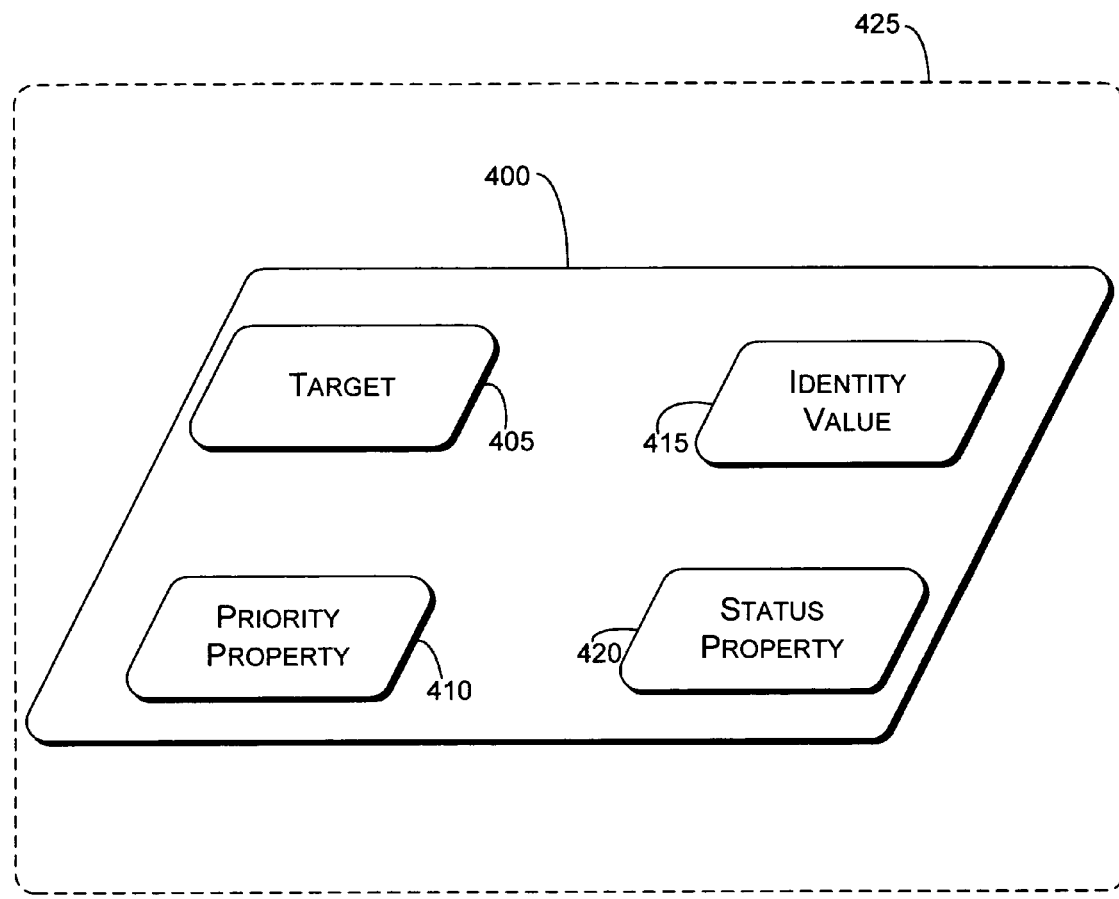
FIG. 4 shows an example of an object reference utilized in implementations of abstracting managed code execution.
Figure 5:
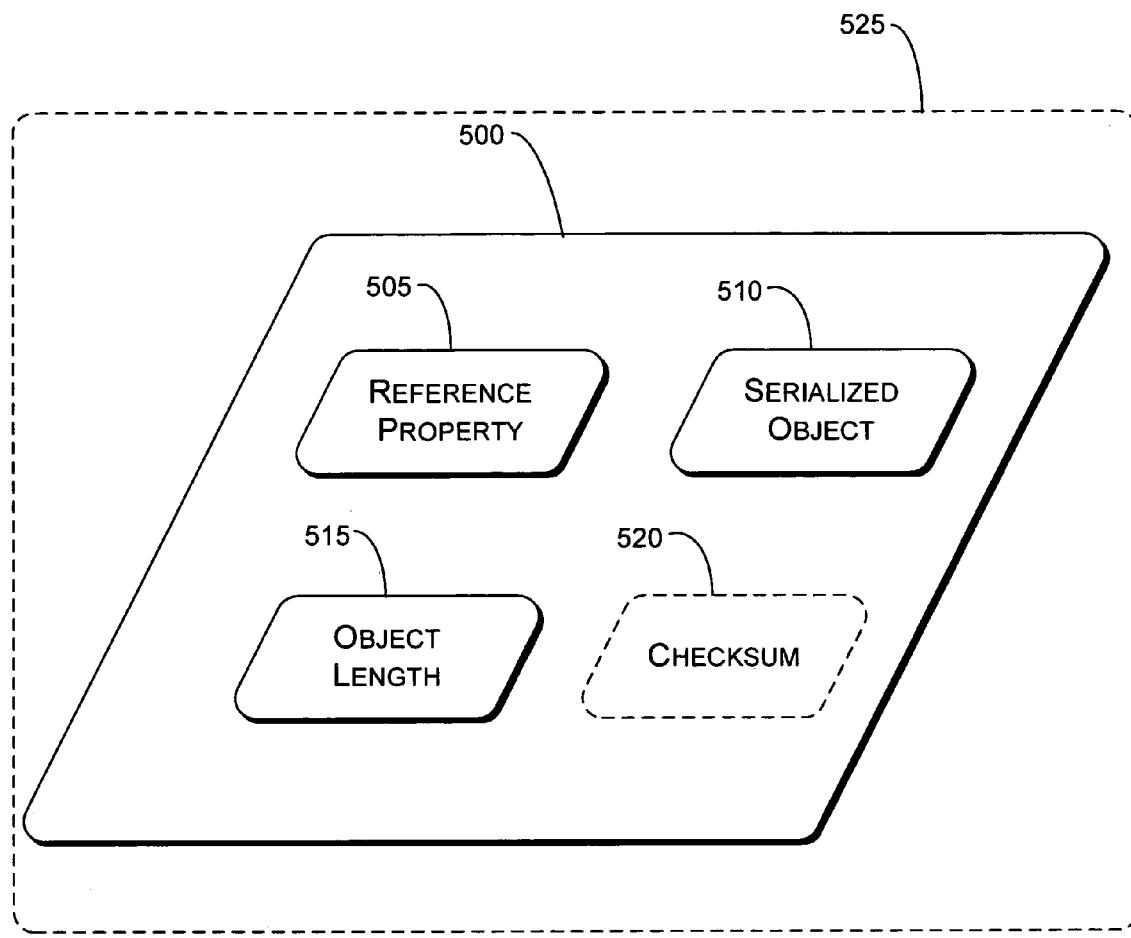
FIG. 5 shows an example of a header utilized in implementations of abstracting managed code execution.
Figure 6:
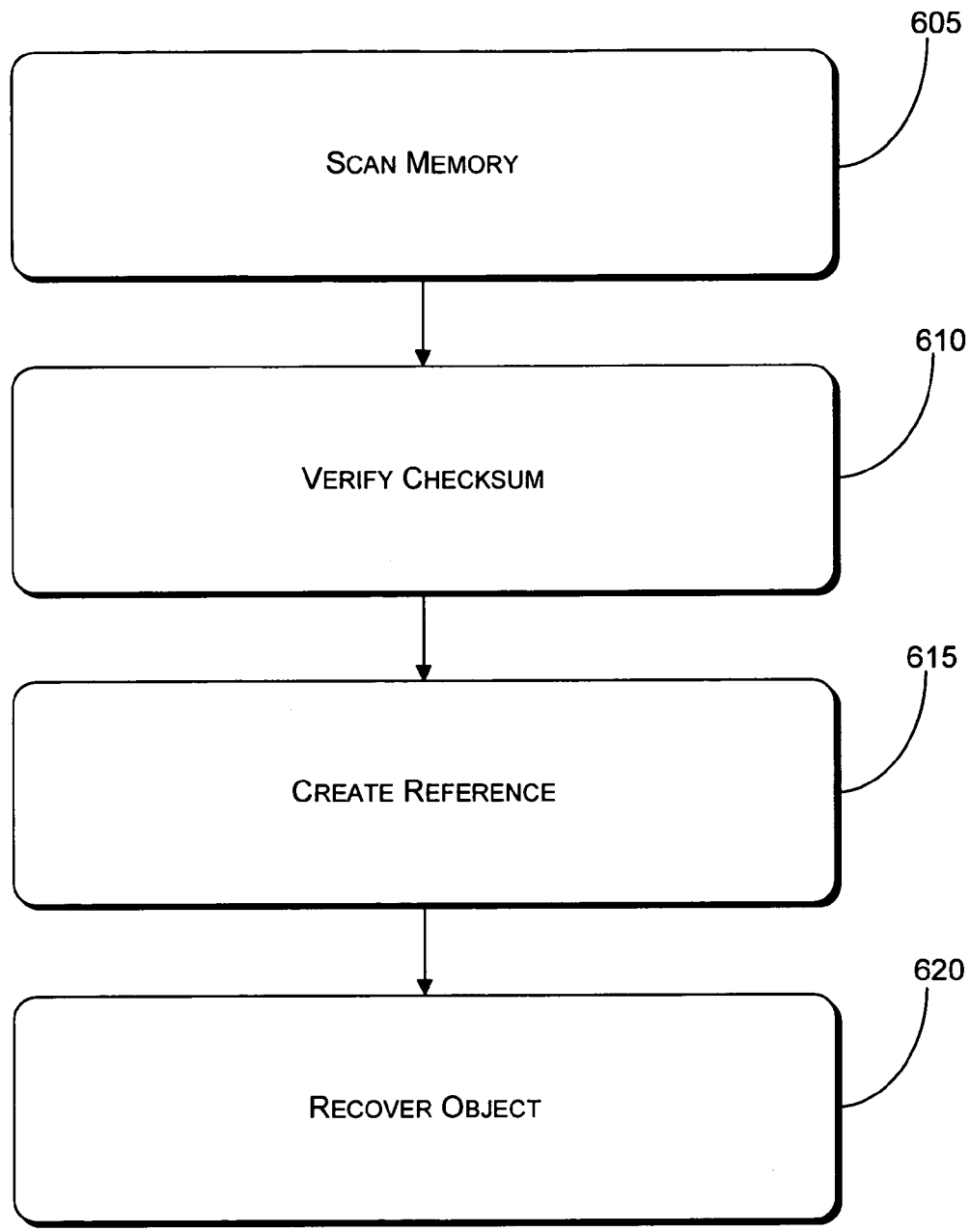
FIG. 6 shows an example of a processing flow for abstracting managed code execution, further to the examples of FIGS. 4 and 5.

FIGS. 4-6 are provided in accordance with examples of resource management in runtime execution environment 225 (FIGS. 2 and 3). More particularly, runtime execution environment 225 annotates objects with properties and utilizes such annotations to manage resources.

FIG. 4 shows an example of object reference 400 utilized in example implementations for abstracting managed code execution. In particular, reference 400, which may be stored in volatile memory 425, may include a weak reference for which semantics have been extended. Such reference may be implemented, at least in part, on top of memory management component 310 and type system component 315 of runtime execution environment 225 (FIG. 3) to provide, at least, data persistence functionality.

Extended weak reference 400 may include target parameter 405 to identify an object to which reference 400 refers, clean-up priority property 410, and identity property 415 for data recovery purposes. Further examples of extended weak reference 400 may also include status property 420 to indicate a pendency status of extended weak reference 400. The description that follows may alternatively refer to extended weak reference 400 as reference 400.

Resource management in runtime execution environment 225 may implement automatic reclamation of memory space that has been previously allocated but is no longer accessible. Such reclamation of memory allocated to objects that are no longer used by an application may be referred to as garbage collection, which has been discussed previously. An object may be considered to be unreachable if all references to it become invalid, for example, by setting such references to a null reference. A directly or indirectly referenced object is considered to be reachable, and the runtime execution environment does not reclaim such object. The reference to such object may be referred to as a "strong reference". By contrast, a "weak reference," such as reference 400 for example, may also reference a reachable object (ie., "target") by target property 405, but does not disallow garbage collection of the target. If there is no strong reference to the target, even though it has a weak reference, the target may be eligible for garbage collection. For example, this type of weak reference may be useful for implementing caches of objects, where results of operations can be stored; if the system runs out of memory, the garbage collector may reclaim all the of cached results as it needs memory.

According to at least one example of runtime execution environment 225, an object referred to by reference 400 may not be reclaimed during a first garbage collection implementation. Rather, recognizing reference 400 as a weak reference for which semantics have been extended, runtime execution environment 225 may reclaim reference 400 after free memory available to runtime execution environment 225 falls below a predetermined threshold level. Further still, example implementations of garbage collection in runtime execution environment 225 may reclaim an object, which is referred to by reference 400, individually. Thus, a temporary peak in memory utilization in runtime execution environment 225 does not result in an entire state of an application from being wiped out.

Clean-up (i.e., garbage collection) priority property 410 may be utilized by runtime execution environment 225 to sort a list of multiple implementations of reference 400, each implementation of reference 400 targeting different objects of course. Thus, when a target of one implementation of reference 400 is accessed, that implementation of reference 400 may be moved to a leading position of a sub-list of references having a same priority property. The reclamation process may then work primarily in ascending order, in terms of priority properties associated with respective implementations of reference 400 and, secondarily, from the least recently accessed object to the most recently accessed object. Thus, lower priority and older objects are reclaimed first.

Identity property 415 may be provided so that memory management component 310 (FIG. 3) or another memory manager in runtime execution environment 225 may understand that an object referred to by reference 400 is to persist in the event of a volatile memory loss, such a re-start or a power loss event for computing device platform 200. More particularly, every one of application 235, 235', and 235" (FIG. 2) may require configuration information, and may further require data from a network or runtime execution environment 225. Such information may be saved (i.e., persisted) for restoration after the re-start or recovery from the power loss event, and identity property 415 identifies the data to be persisted. To be able to recover the data after such a reboot or power loss event, the respective application selects identity property 415, so that all objects having such identity property may be discerned.

According to at least one implementation of reference 400, identity property 415 may be a pair of the form "<type, integer>" by which "type" may be a known runtime execution environment type, and "integer" may be a runtime execution environment type representing a signed number. To prevent other applications from creating the same identifiers, the type may be declared to be privately scoped within an assembly for the respective application.

Status property 420 may be provided so that memory management component 310 (FIG. 3) or any other memory manager in runtime execution environment 225 may understand that an object referred to by reference 400 is to be stored in a persistent storage on a priority basis.

FIG. 5 shows an example of persistence header 500, which may be created on, e.g., memory management component 310 or another memory manager in runtime execution environment 225. More particularly, header 500 may be created when at least one of applications 235, 235', or 235" (FIG. 2) assign a target object to reference 400 or when the target object of reference 400 is eligible for garbage collection.

According to at least one implementation, header 500 may include the following: at least one property from reference 400, including priority property 410 and identity value 415; a serialization 510 of the target object, as a binary block, which may be serialized (i.e., converted into a serial stream) before a power loss event for computing device platform 200; length value 515, which may measure the length of the serialization in bits, bytes, or any other known parameter. Alternative implementations of header 500 may include a checksum being calculated for the header, including the serialization of the object and the permutation of reference properties included in header 500. The checksum value itself may then be included in, or otherwise associated with, header 500. The checksum may be calculated using, for example, a CRC32 checksum algorithm, an MD5 checksum algorithm, or a hash function.

Header 500 may be written to memory 525. Memory 525 may be volatile memory or non-volatile memory depending upon, primarily, persistence properties. For persistence of data upon a power-loss event for computing device platform 200 (FIG. 2), memory 525 may be a non-volatile memory, e.g., an EEPROM chip, FLASH-ROM, a hard drive, or any other medium that does not need constant power to maintain state. To support other forms of storage, at power up runtime execution environment 225 may scan persistent forms of storage and recreate any discovered implementations of reference 400.

The serialization of an object into serialized object 510 may be implemented to conserve resources, as a serialized version of an object is typically smaller than a live version of the object. Further, if reference 400, which is associated with header 500, is accessed later by at least one of applications 235, 235', or 235", runtime execution environment 225 may de-serialize serialized object 510 from memory 525 and recreate a live version of the corresponding object, which may then be assigned back to reference 400 for use thereof.

Upon re-start of computing device platform 200, runtime execution environment 225 may scan a system memory (e.g., memory heap) in search of persistence headers (i.e., header 500) that may have been previously stored in non-volatile storage. For each implementation of header 500 that is found, a corresponding checksum 520 may be verified. Validation of checksum 520 may thus serve as a catalyst for re-creating reference 400 and associating header 500 with reference 400. A list of references 400 that are re-created may be included in a linked list so that subsequent access by an application may trigger recovery of a corresponding object with corresponding state restored.

When status property 420 of reference 400 indicates that at least one transfer of reference 400 to a non-volatile memory is pending, the runtime execution environment may store respective implementations of reference 400 to non-volatile memory on a priority basis (e.g., in accordance with priority property 410).

Runtime execution environment 225 may intentionally terminate an implementation of reference 400 by assigning a null target value 405 to the particular implementation of reference 400 or by dropping a reference to reference 400. Memory management component 310 or other implementation of a memory manager may then detect a loss of strong references during a subsequent garbage collection sweep and erase data corresponding to the intentionally terminated reference 400 from a form of persistent storage.

FIG. 6 shows processing flow 600 for an example implementation of resource management by runtime execution environment 225 upon start-up of computing device platform 200 following a power-loss event such as a system shutdown.

At block 605, runtime execution environment 225 may scan a persistent storage in search of implementations of header 500.

At block 610, upon finding at least one implementation of header 500, checksum value 520 associated with header 500 may be verified.

At block 615, upon positive verification of checksum 520, reference 400 may be re-created from the at least one property 505 associated with header 500.

At block 620, an object targeted by reference 400 may be restored upon reference 400 being accessed.

Accordingly, as shown by the examples of FIGS. 4-6, reference 400 and header 500 may provide a basis for a declarative model of resource management on runtime execution environment 225 whereby an application may create objects and define critical properties. Thus, runtime execution environment 225 may manage resources on behalf of an application by utilizing values of these properties, thus enabling automatic management (e.g., persistence) of objects and corresponding data.

Figure 7:
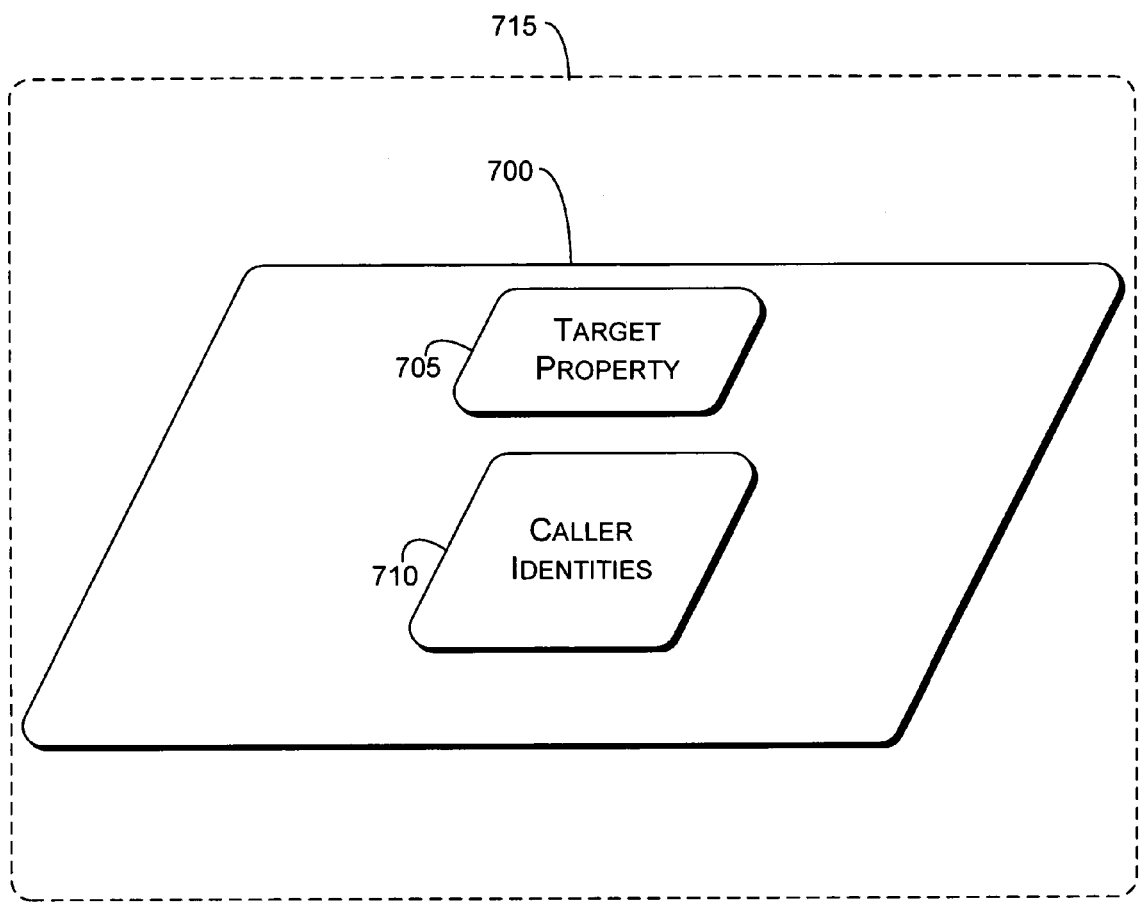
FIG. 7 shows an example of a delegate utilized in implementations of abstracting managed code execution.
Figure 8:
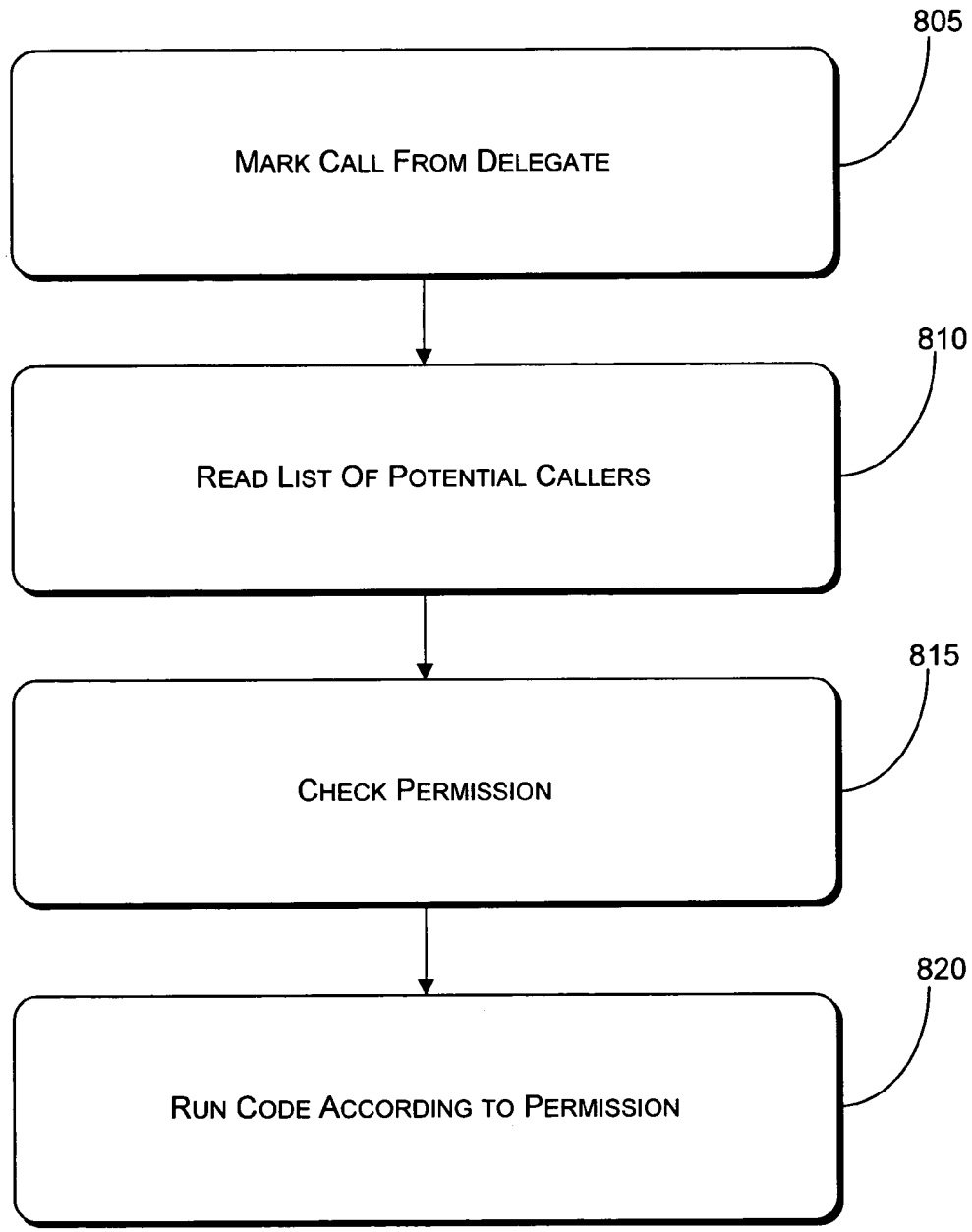
FIG. 8 shows an example of a processing flow for abstracting managed code execution, further to the example of FIG. 7.

FIGS. 7 and 8 are provided in accordance with examples of resource management in runtime execution environment 225 (FIGS. 2 and 3). More particularly, example implementations of runtime execution environment 225 may annotate a calling delegate with at least the identity for potential callers to a common publisher, as part of a code access security implementation. A potential caller may be identified by a method property of a corresponding activation record. By at least one example, such potential callers may be other delegates.

FIG. 7 shows an example of delegate 700 utilized by at least one example implementation of runtime execution environment 225 when invoked by publisher 715. Delegate 700 may be regarded as a structure that refers to a static method or to a class instance, as well as to an instance method of the class. Further, delegate 700 may be used to implement a callback or publisher/subscriber model, where at least one of applications 235, 235', or 235" (FIG. 2) may request notification of an event or activity. To thus set up a notification, the respective application may register a delegate with a publisher of a particular event, and invoke the registered subscribers upon occurrence of the event.

For at least one example implementation of delegate 700 that is associated with instance methods, target property 705 may be marked as not pending. Thus, in the event of garbage collection, the delegate may be removed. Accordingly, a potential for memory leaks is diminished.

A further example of delegate 700 may enable runtime execution environment 225 to implement code access security when delegates are being shared. More particularly, an example of delegate 700 may be populated with target property 705 and also be annotated with at least the identities 710 of potential callers that may also be identified by having the same target property 705 on a corresponding activation record. That is, a delegate 700 that may call a particular method may also identify other potential callers to the same method.

FIG. 8 shows example processing flow 800 for an example implementation of runtime execution environment 225 providing code security access to a publisher/subscriber system on top of execution component 330 (FIG. 3). More particularly, processing flow 800 may be implemented when at least one of applications 235, 235', or 235" (FIG. 2) attempts to run code associated with a delegate calling a publisher.

At block 805, when a publisher invokes delegate 700, the call may be marked as coming from delegate 700.

At block 810, the identities 710 of potential callers to publisher 715 may be read from delegate 700.

At block 815, permissions for delegate 700 as well as the identified potential callers may be verified against subscriptions to publisher 715.

At block 820, code may be run by the requesting application if all permission verifications are positive. That is, if any one of delegate 700 or the delegates identified are denied permission (i.e., negative), runtime execution environment 225 may throw an exception, thus preventing execution of the target method. Thus, an attempt at identity spoofing may be disrupted.

Accordingly, by the examples described in connection with FIGS. 7 and 8, runtime execution environment 225 may be able to prevent undesirable code execution in an abstracted managed code execution environment.

Figure 9:
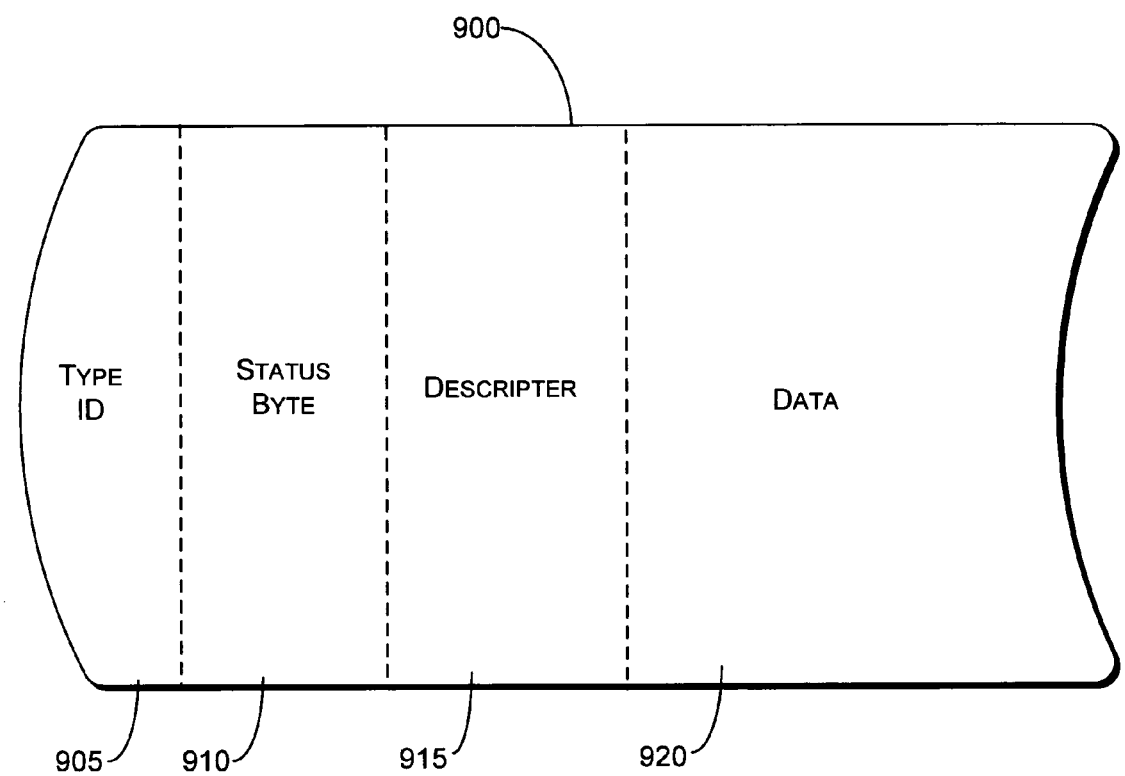
FIG. 9 shows an example of a memory block utilized for abstracting managed code execution.

FIG. 9 shows an example of memory block 900 implemented in an abstracted managed code execution environment. At least one implementation of memory block 900 may be utilized by runtime execution environment (FIGS. 2 and 3) on computing device platform 200 (FIG. 2) when resources are constrained. Thus, at least one example of runtime execution environment 225 may regard memory space as being a collection of uniform, typed blocks of a predetermined size (e.g., 12 bytes).

By implementing a uniform (i.e., fixed-length) memory space, runtime execution environment 225 may provide a direct correspondence between a position of data fields in metadata of an object and an offset of a block in memory. Such uniformity in memory block 900 may be leveraged since IL is executed in runtime execution environment 225 as a high-level language. Therefore, an application may be absolved of specifying a number of bytes needed for a particular operation so long as runtime execution environment 225 is cognizant of a size and location (i.e., offset) of operands for memory block 900.

In an example of memory block 900, memory sub-block 905 may define a type of value carried by block 900. Sub-block 905 may be of any predetermined size. By the example whereby memory block 900 is 12 bytes, sub-block may be predetermined to be a first field therein consisting of one (1) byte.

Sub-block 910 may provide support for various processes implemented by runtime execution environment 225. Thus, sub-block 910 may be regarded as a support byte, in accordance with a predetermined size. An example of the support provided by support byte 910 may include garbage collection, whereby a predetermined bit of support byte 910 may denote whether memory block 900 is accessible or not. Therefore, as memory block 900 is scanned to implement a process, runtime execution environment 225 may look to a designated bit within a designated byte of a block of memory.

Sub-block 915 may consist of a predetermined number of bytes to denote a description of an object that is composed of memory block 900 and other memory blocks as well. More particularly, the description may provide at least the number of adjacent blocks that, along with memory block 900, comprise the object.

All of sub-blocks 905, 910, and 915, as well as any other sub-blocks designated by runtime execution environment 225 may be implemented with consideration given to maximizing constrained memory resources. Thus, by the example of memory block 900 consisting of 12 bytes, sub-block 920 may consist of eight (8) bytes of data.

Accordingly, by the example of memory block 900, all managed types, whether value or reference types, may be treated equally. Thus, assigning a value type to another value type may copy the contents of the whole variable, instead of simply a reference thereto. IL may treat a value type as any other type, and therefore some operations may affect multiple blocks of memory. To avoid damaging a correspondence between position and offset in memory 900, runtime execution environment 225 may implement a value copy process in terms of cloning objects with reference copy process rules: when an interpreted operation that deals with value types is encountered (e.g., pushing value types onto an evaluation stack), a copy of the object may be created using memory from the heap.

Figure 10:
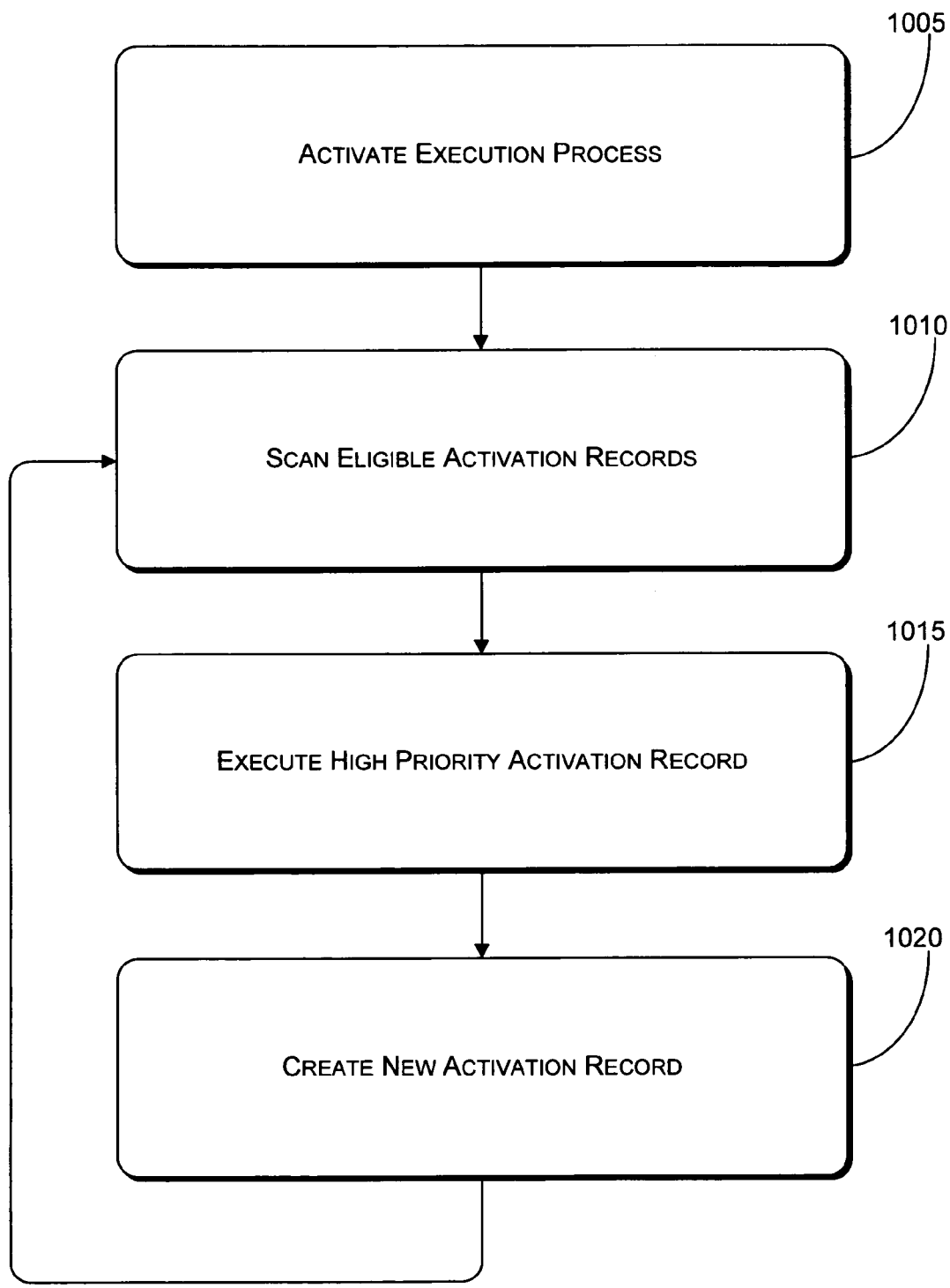
FIG. 10 shows an example of a processing flow for cooperative threading used to abstract managed code execution.

FIG. 10 shows an example of processing flow 1000 that may be implemented for cooperative threading in an abstracted managed code execution environment.

At least one implementation of processing flow 1000 may be implemented by runtime execution environment 225 on computing device platform 200 when resources are constrained. That is, processing flow 1000 may be implemented to provide a versatile application environment which supports multi-threading in a constrained environment, and further to allow simplified code development having multiple, logically independent flows of execution (e.g., a UI following one flow, while periodic events follow another flow, and network processing following yet another flow).

According to at least one example, computing device platform 200 may be single-threaded and therefore runtime execution environment 225 may be implemented utilizing a list of threads and a linked list of activation records for each thread.

At block 1005, for example, runtime execution environment 225 may activate an execution process, i.e., execute a main loop, waiting for a thread to become active.

At block 1010, runtime execution environment 225 may scan the linked list of eligible activation records for each active thread. An activation record may be considered to be eligible for execution if a corresponding thread is active.

At block 1015, the eligible activation record having the highest execution priority may be executed. A priority may be set for an activation record in accordance with multiple factors and may be stacked in accordance with multiple methodologies. Implementation of examples of processing flow 1000 does not require specificity of such factors and methodologies. Further, according to at least one example, execution of the activation record at block 1015 may be implemented by an interpreter loop on runtime execution environment 225.

At block 1020, a new activation record may be created in accordance with a new method invoked by the activation record for which execution occurs at block 1015. However, by at least one example implementation of processing flow 1000, the newly created activation record is not executed recursively. Rather, the newly created activation record is linked to the existing activation record list for the respective thread, and the loop may reenter by scanning eligible activation records at block 1010.

According to at least one example, if the newly created activation record is implemented in native code, native code may be called directly. However, the native code may not make a direct call back to managed code. Rather, native code may create an activation record and indicate execution has been pre-empted. Thus, the execution process may re-start. When managed code is terminated, execution may revert to native code. Since there is one entry point for native code, and native code is to properly restart execution at an appropriate point in the processing flow 1000, state information that may otherwise be handled by a processor may be saved in the form of a program counter.

Further, according to an example implementation of processing flow 1000, if a thread is to make a blocking call, wait for an event, or take a long time to complete a function, the thread may be suspended, exited to the main loop, and returned to a list of waiting threads. That is, with one real physical thread, a long thread execution may appear to be a hang of the system to the user. Thus, runtime execution environment 225 may take steps to fairly execute other threads.

It is to be understood that the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Reference has been made throughout this specification to "an example," "alternative examples," "at least one example," "an embodiment," or "an example embodiment" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method for memory management for abstracted managed code execution on a runtime execution environment, comprising:

creating a reference to an object based at least in part on one or more weak references for which semantics have been extended, wherein the reference assembles at least one of a target property for the object, a clean-up priority property for the object, and an identifying value for the object;

creating a plurality of references to different objects wherein each of the plurality of references comprises the clean-up priority property;

sorting the plurality of references by respective clean-up priority property, such that when multiple implementations of each of the plurality of references are accessed, that implementation of the plurality of references is moved to a leading position of a sub-list of references having the same clean-up priority property;

reclaiming the different objects referenced by the plurality of references in an ascending order based on the clean-up priority property associated with respective implementations of one of each reference during the garbage collection process only after the memory available to the runtime execution environment falls below the predetermined threshold level, wherein the lower priority and older objects are reclaimed first;

creating a header for the object comprising at least one property from the reference and a serialization of the object and wherein creating a header for the object assembles a serialized version of the object, a value for a length value of the object, and at least one of a target property for the object, a garbage collection property for the object, and an identifying value for the object;

calculating a checksum of the header and the serialization of the object;

associating the calculated checksum with the header; and storing the header into memory.

2. A method according to claim 1, wherein the object has properties including at least one of characters, integers, booleans, floating points, pointers, strings, or objects.

3. A method according to claim 1, wherein the reference to the object includes a pendency status property for the object.

4. A method according to claim 1, wherein the identifying value for the object includes an instance of a system type.

5. A method according to claim 1, wherein the identifying value for the object includes an integer.

6. A method according to claim 1, wherein the header includes at least one of a clean-up priority property for the object, an identifying value for the object, a value indicating a length of the serialized object, or the serialized object.

7. A method according to claim 1, wherein calculating a checksum for the header includes implementing a CRC32 algorithm.

8. A method according to claim 1, further comprising:
scanning the storage for the header;
verifying validity of a checksum value associated with the header;
re-creating the reference;
associating the reference to the header; and
de-serializing the object when the reference is accessed.

9. A method according to claim 8, wherein scanning for the header includes scanning of a portion of memory by a runtime execution environment.

10. A method according to claim 1,
wherein the reference to the object includes a pendency status identifying property for the object,
wherein the header includes at least one of a clean-up priority value for the object, an identifying value for the object, a value indicating a length of the serialized object, or the serialized object, and
wherein storing the header includes writing the header to persistent memory.

11. A method according to claim 10, wherein the persistent memory maintains state without constant electrical power.

12. A method according to claim 10, wherein the persistent memory is any one of an EEPROM chip or a FLASH chip.

13. A method according to claim 1, wherein the method is implemented on a watch.

14. A computer-readable storage medium having one or more executable instructions stored thereon that, when executed, cause one or more processors to perform a method for memory management for abstracted managed code execution on a runtime execution environment, the method comprising:

creating a reference to an object based at least in part on one or more weak references for which semantics have been extended, wherein the reference assembles at least one of a target property for the object, a clean-up priority property for the object, and an identifying value for the object;

creating a plurality of references to different objects wherein each of the plurality of references comprises the clean-up priority property;

sorting the plurality of references by respective clean-up priority property, such that when multiple implementations of each of the plurality of references are accessed, that implementation of the plurality of references is moved to a leading position of a sub-list of references having the same clean-up priority property;

reclaiming the different objects referenced by the plurality of references in an ascending order based on the clean-up priority property associated with respective implementations of one of each reference during the garbage collection process only after the memory available to the runtime execution environment falls below the predetermined threshold level, wherein the lower priority and older objects are reclaimed first;

creating a header for the object, the header comprising:
at least one data field containing at least a portion of a reference to an object;
at least one data field containing at least a portion of a serialization of the object; and
at least one data field containing at least a parameterized value of the object; and storing the header.

15. A computer-readable storage medium according to claim 14, wherein the object includes at least one of characters, integers, booleans, floating points, pointers, strings, or objects.

16. A computer-readable storage medium according to claim 14, wherein the reference to the object includes a pendency status property for the object.

17. A computer-readable storage medium according to claim 16, wherein at least the serialized version of the object is accessible by a runtime environment via a link.

18. A computer-readable storage medium according to claim 14, wherein the identifying value for the object includes an instance of a system type.

19. A computer-readable storage medium according to claim 14, wherein the identifying value for the object includes an integer.

20. A computer-readable storage medium having one or more executable instructions stored thereon that, when executed, cause one or more processors to perform a method for memory management for abstracted managed code execution on a runtime execution environment upon restarting of a computing device, the method comprising:

scanning at least a portion of a memory for a header having at least one particular property, including priority property and identity value;

verifying a checksum for the header;

creating a reference targeting an object associated with the header based at least in part on one or more weak references for which semantics have been extended, wherein the reference assembles at least one of a target property for the object, a garbage collection property for the object, and an identifying value for the object;

sorting the plurality of references by respective clean-up priority property, such that when multiple implementations of each of the plurality of references are accessed, that implementation of the plurality of references is moved to a leading position of a sub-list of references having the same clean-up priority property;

reclaiming the different objects referenced by the plurality of references in an ascending order based on the clean-up priority property associated with respective implementations of one of each reference during the garbage collection process only after the memory available to the runtime execution environment falls below the predetermined threshold level, wherein the lower priority and older objects are reclaimed first;

calculating a checksum of the header and a serialization of the object;

associating the calculated checksum with the header; and storing the header into memory.

21. A computer-readable storage medium according to claim 20, wherein the portion of the memory includes a heap.

22. A computer-readable storage medium according to claim 20, wherein the identifying value for the object includes an instance of a system type.

23. A computer-readable storage medium according to claim 20, wherein the identifying value for the object includes an integer.

24. A computer-readable storage medium according to claim 20, wherein the one or more instructions to verify a checksum for the header cause the one or more processors to implement a CRC32 algorithm.

25. A computer-readable storage medium according to claim 20, wherein the one or more instructions to create a reference cause the one or more processors to construct a data structure having at least a target property for the object and an identifying value for the object.

26. A computer-readable storage medium according to claim 20, wherein the one or more processors execute the one or more computer-executable instructions on a watch.

27. An apparatus with storage media for memory management for abstracted managed code execution on a runtime execution environment, comprising:

means for creating a reference to an object based at least in part on one or more weak references for which semantics have been extended, wherein the means for creating a reference assembles at least one of a target property for the object, a garbage collection property for the object, and an identifying value for the object and wherein the means for creating a header for the object assembles a serialized version of the object, a value for a physical parameter of the object, and at least one of a target property for the object, a garbage collection property for the object, and an identifying value for the object;

means for creating a header for the object;

means for managing the object in accordance with the header;

means for sorting the plurality of references by respective clean-up priority property, such that when multiple implementations of each of the plurality of references are accessed, that implementation of the plurality of references is moved to a leading position of a sub-list of references having the same clean-up priority property;

means for reclaiming the different objects referenced by the plurality of references in an ascending order based on the clean-up priority property associated with respective implementations of one of each reference during the garbage collection process only after the memory available to the runtime execution environment falls below the predetermined threshold level, wherein the lower priority and older objects are reclaimed first;

means for calculating a checksum of the header and the serialization of the object;

means for associating the calculated checksum with the header; and means for storing the header into memory.

* * * * *